United States Patent
Toya

(10) Patent No.: US 11,506,539 B2
(45) Date of Patent: Nov. 22, 2022

(54) MEASUREMENT DEVICE, PRINTER, AND MEASUREMENT METHOD

(71) Applicant: SEIKO EPSON CORPORATION, Tokyo (JP)

(72) Inventor: Takashi Toya, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 32 days.

(21) Appl. No.: 17/134,878

(22) Filed: Dec. 28, 2020

(65) Prior Publication Data

US 2021/0190592 A1    Jun. 24, 2021

(30) Foreign Application Priority Data

Dec. 24, 2019    (JP) .............................. JP2019-232806

(51) Int. Cl.
   *G01J 3/52*    (2006.01)
   *G01J 3/28*    (2006.01)
   (Continued)

(52) U.S. Cl.
   CPC ............... *G01J 3/524* (2013.01); *G01J 3/027* (2013.01); *G01J 3/26* (2013.01); *G01J 3/2823* (2013.01);
   (Continued)

(58) Field of Classification Search
   CPC .... G01J 3/524; G01J 3/52; G01J 3/027; G01J 3/2823; G01J 3/26; G01J 3/462; H04N 1/6044
   See application file for complete search history.

(56) References Cited

U.S. PATENT DOCUMENTS

| 2016/0258813 A1 | 9/2016 | Kuri |
| 2016/0286054 A1 | 9/2016 | Kuri |

(Continued)

FOREIGN PATENT DOCUMENTS

| JP | 2006258683 A | 9/2006 |
| JP | 2016166865 A | 9/2016 |

(Continued)

*Primary Examiner* — Dominic J Bologna
(74) *Attorney, Agent, or Firm* — Chip Law Group

(57) ABSTRACT

Provided is a measurement device including a spectroscope, a movement mechanism configured to relatively move the spectroscope along a first direction with respect to the measurement target, and one or more processors configured to execute detecting a measurement error indicating that spectroscopic measurement processing by the spectroscope is not executed normally, and controlling the spectroscope and the movement mechanism, in which the one or more processors, when the measurement target is a plurality of color patches arranged along the first direction, cause the spectroscope to execute first measurement processing of measuring light with a specific wavelength set in advance while relatively moving the spectroscope in the first direction to acquire a measured value with respect to the specific wavelength obtained by the first measurement processing and a position of the spectroscope, and when the measurement error is detected, move the spectroscope to a position where an amount of variation of the measured value is greater than or equal to a threshold value in a second direction opposite to the first direction and then move the spectroscope in the first direction.

9 Claims, 10 Drawing Sheets

(51) Int. Cl.
*G01J 3/26* (2006.01)
*G01J 3/46* (2006.01)
*G01J 3/02* (2006.01)
*H04N 1/60* (2006.01)

(52) U.S. Cl.
CPC ............... *G01J 3/462* (2013.01); *G01J 3/52* (2013.01); *H04N 1/6044* (2013.01)

(56) References Cited

U.S. PATENT DOCUMENTS

2016/0370230 A1* 12/2016 Nishimura ............ G02B 26/001
2016/0379095 A1* 12/2016 Nozawa .................... G01J 3/52
                                                          358/1.9
2018/0149857 A1*  5/2018 Nozawa ................ G01J 3/0208
2019/0271591 A1*  9/2019 Chen .................... G01N 21/274

FOREIGN PATENT DOCUMENTS

| JP | 2016180610 A | 10/2016 |
| JP | 2017009461 A | 1/2017 |
| JP | 2017111059 A | 6/2017 |
| JP | 2017134078 A | 8/2017 |

* cited by examiner

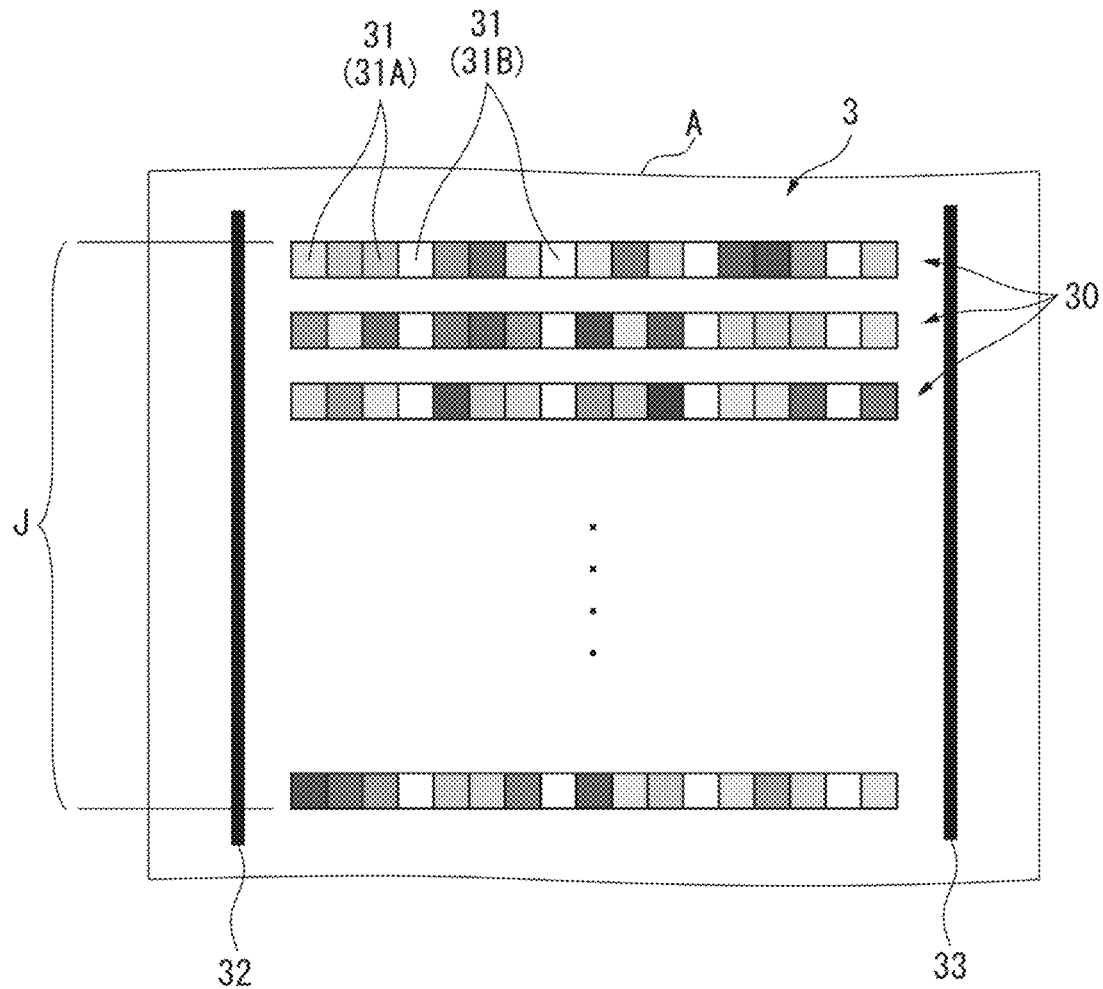
FIG. 7
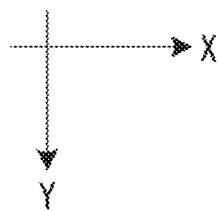

| PATCH ID | MEASURED VALUE | AMOUNT OF VARIATION OF MEASURED VALUE |
|---|---|---|
| 9 | × | |
| 8 | 1005 | 7 |
| 7 | 1012 | 23 |
| 6 | 1035 | 21 |
| 5 | 1046 | 7 |
| 4 | 1023 | 22 |
| 3 | 1034 | 11 |
| 2 | 1029 | 5 |
| 1 | 1017 | 12 |

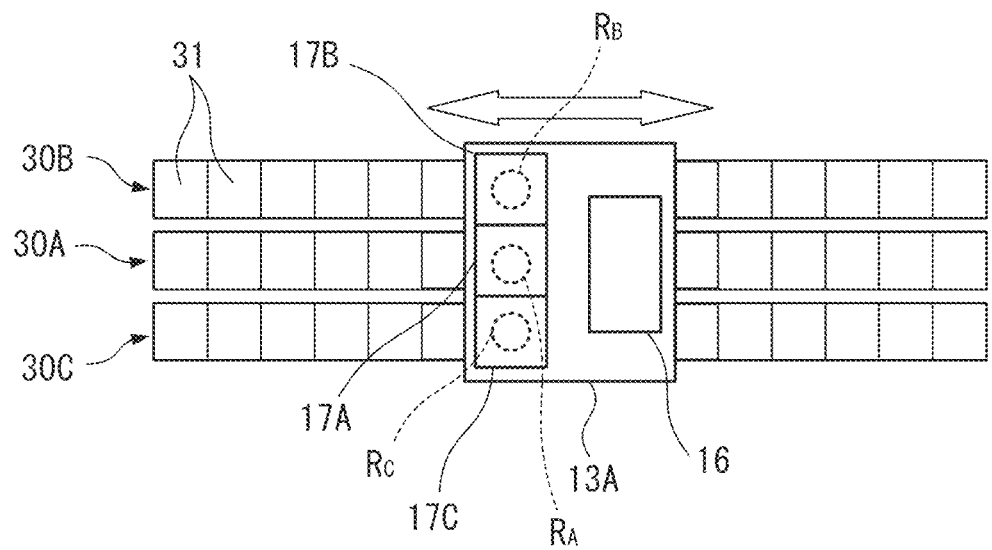
FIG. 10
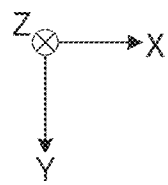

MEASUREMENT DEVICE, PRINTER, AND MEASUREMENT METHOD

The present application is based on, and claims priority from JP Application Serial Number 2019-232806, filed Dec. 24, 2019, the disclosure of which is hereby incorporated by reference herein in its entirety.

BACKGROUND

1. Technical Field

The present disclosure relates to a measurement device, a printer, and a measurement method.

2. Related Art

In the related art, there is known a measurement device for performing a color measurement of a color patch printed on a medium (for example, refer to JP-A-2006-258683).

The measurement device described in JP-A-2006-258683 is a device for measuring a color patch formed side by side in a row direction and a column direction by a manual colorimeter. While moving the manual colorimeter along the row direction, the measurement device measures each color patch arranged in the row direction and stores a colorimetric value in a colorimetric result table. Further, the measurement device determines whether the colorimetric value is abnormal or normal. When it is abnormal, the measurement device stores the colorimetric value in the colorimetric result table as color measurement error (measurement error). The measurement device reads out the colorimetric result table, detects a color patch in which the colorimetric result is abnormal, and displays a chart image displaying the abnormal color patch on a display.

However, in the measurement device described in JP-A-2006-258683, since a color patch having a measurement error is displayed after all the color patches are measured using the colorimeter, it is necessary for a user to move the colorimeter to the color patch having the measurement error and perform the color measurement again. Further, in general, there are many color patches, which become color measurement targets, that do not have coordinate information, and it is difficult to move the colorimeter to the position of the color patch where the measurement error occurs.

SUMMARY

A measurement device according to a first aspect of the present disclosure includes: a spectroscope configured to measure light with a predetermined spectral wavelength of incident light from a measurement target and change the spectral wavelength; a movement mechanism configured to relatively move the spectroscope along a first direction with respect to the measurement target; and one or more processors configured to execute detecting a measurement error indicating that spectroscopic measurement processing by the spectroscope is not executed normally, and controlling the spectroscope and the movement mechanism, in which the one or more processors, when the measurement target is a plurality of color patches arranged along the first direction, cause the spectroscope to execute first measurement processing of measuring light with a specific wavelength set in advance while relatively moving the spectroscope in the first direction to acquire a measured value with respect to the specific wavelength obtained by the first measurement processing and a position of the spectroscope, and when the measurement error is detected, move the spectroscope to a position where an amount of variation of the measured value is greater than or equal to a threshold value in a second direction opposite to the first direction and then move the spectroscope in the first direction.

A printer according to a second aspect of the present disclosure includes: the measurement device according to the first aspect; and a printing portion forming a color chart that includes a plurality of color patches along the first direction on the measurement target.

A measurement method of a measurement device according to a third aspect of the present disclosure includes a spectroscope configured to measure light with a predetermined spectral wavelength of incident light from a measurement target and change the spectral wavelength, a movement mechanism configured to relatively move the spectroscope along a first direction with respect to the measurement target, and one or more processors configured to detect a measurement error indicating that spectroscopic measurement processing by the spectroscope is not executed normally, the method including: when the measurement target is a plurality of color patches arranged along the first direction, causing the spectroscope to execute first measurement processing of measuring light with a specific wavelength set in advance while relatively moving the spectroscope in the first direction to acquire a measured value with respect to the specific wavelength obtained by the first measurement processing and a position of the spectroscope; and when the measurement error is detected, moving the spectroscope to a position where an amount of variation of the measured value is greater than or equal to a threshold value in a second direction opposite to the first direction and then moving the spectroscope in the first direction.

BRIEF DESCRIPTION OF THE DRAWINGS

FIG. 7 is a diagram illustrating an example of a color chart in the first embodiment.

FIG. 10 is a schematic diagram illustrating a configuration of a carriage of a second embodiment.

DESCRIPTION OF EXEMPLARY EMBODIMENTS

First Embodiment

Hereinafter, a first embodiment will be described below. In the present embodiment, a printer 10 including a measurement device will be described below.

Schematic Configuration of Printer 10

Figure 1:
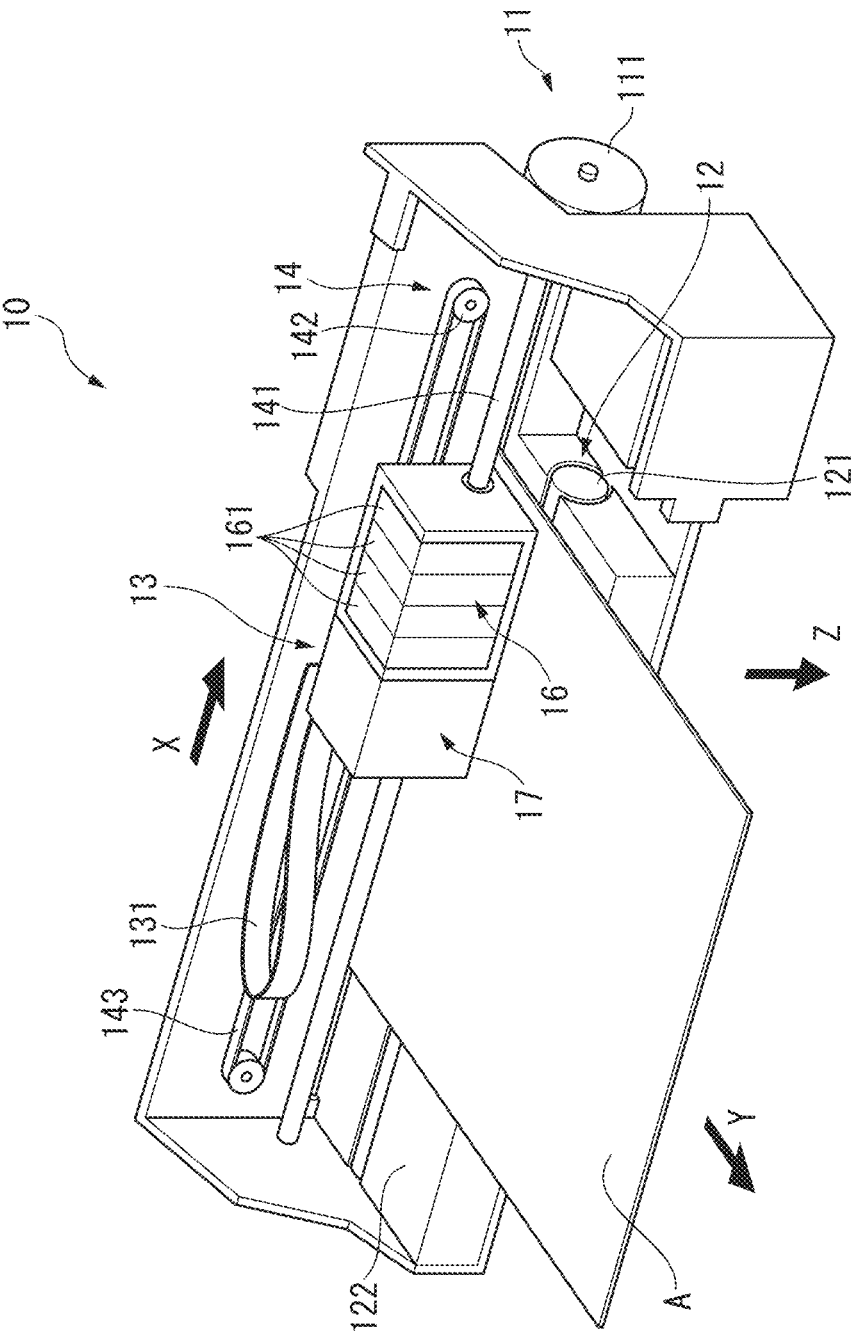
FIG. 1 is an external view illustrating a schematic configuration of a printer of a first embodiment.
Figure 2:
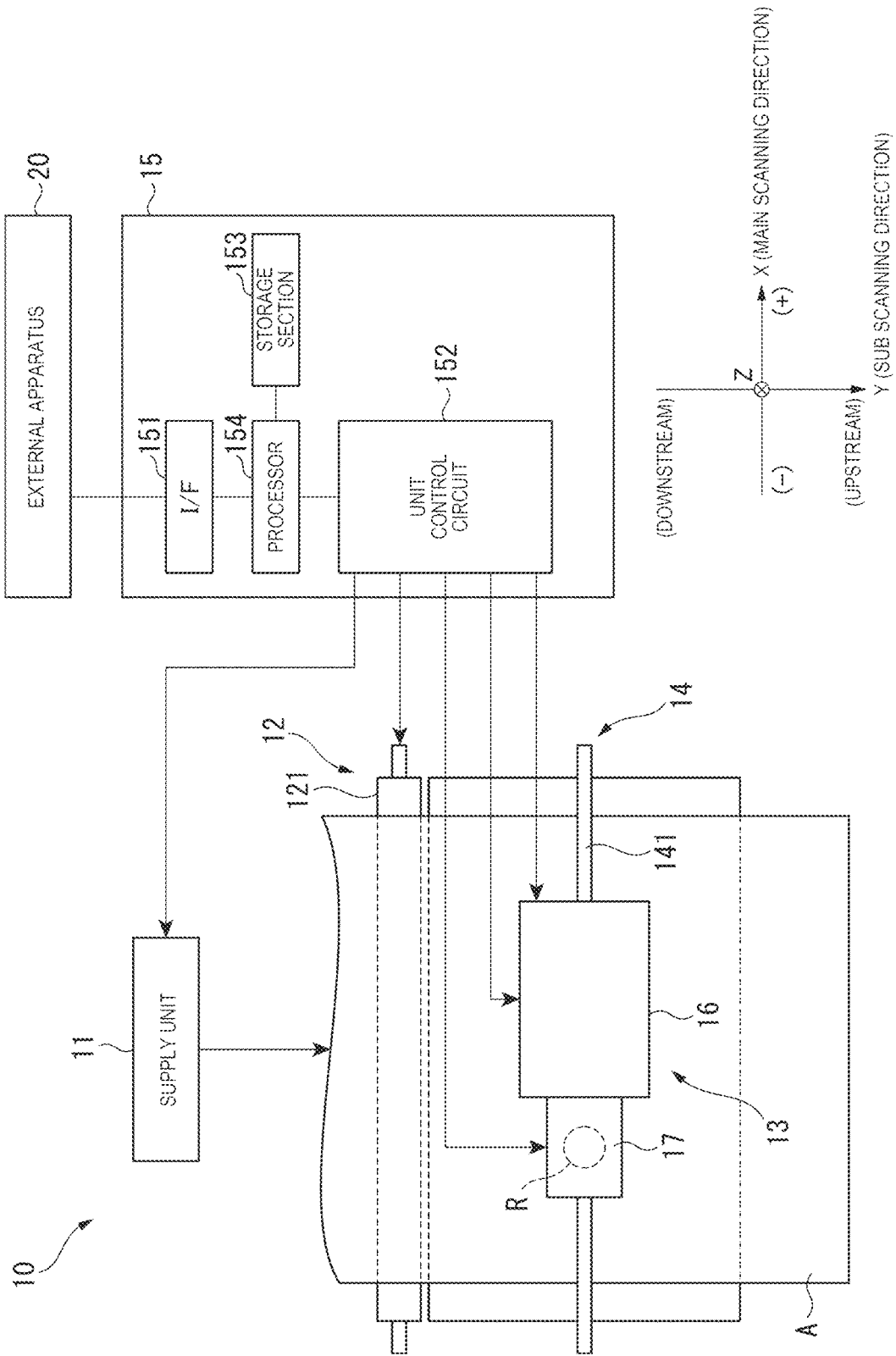
FIG. 2 is a block diagram illustrating a schematic configuration of the printer of the first embodiment.

FIG. 1 is a diagram illustrating a configuration example of an appearance of a printer 10 of the present embodiment. FIG. 2 is a block diagram illustrating a schematic configuration of the printer 10 of the present embodiment. As illustrated in FIG. 1, the printer 10 includes a supply unit 11, a transport unit 12, a carriage 13, a carriage moving unit 14, and a control unit 15 (see FIG. 2). The printer 10 controls each of the units 11, 12, and 14, and the carriage 13 based on print data input from an external apparatus 20 such as a personal computer, for example, and prints an image on a medium A. Further, the printer 10 of the present embodiment forms a color patch 31 for a color measurement (see FIG. 7 and the like) at a predetermined position on the medium A based on data for calibration set in advance, and performs a spectroscopic measurement on the color patch 31. Thereby, the printer 10 compares the measured value, which is the actual measured value with respect to the color patch 31, with the data for calibration to determine whether or not a printed color has color shift, and when there is a color shift, color correction is performed based on the actual measured value. Hereinafter, each configuration of the printer 10 will be specifically described.

The supply unit 11 is a unit for supplying a medium A, which is a measurement target, to an image forming position. The supply unit 11 includes, for example, a roll body 111 around which the medium A is wound, a roll drive motor (not illustrated), a roll drive wheel train (not illustrated), and the like. Based on an instruction from the control unit 15, the roll drive motor is rotationally driven, and a rotational force of the roll drive motor is transmitted to the roll body 111 via the roll drive wheel train. Thereby, the roll body 111 rotates, and the medium A wound around the roll body 111 is supplied to the +Y side. In the present embodiment, an example in which a sheet wound around the roll body 111 is supplied is illustrated, but the present disclosure is not limited to this. For example, the media A may be supplied by any supply methods, such as supplying the media A, such as sheets stacked on a tray or the like, one by one by a roller or the like. Further, as the medium A of the present embodiment, a film, a cloth, or the like can be used in addition to a sheet such as a printing paper.

The transport unit 12 transports the medium A supplied from the supply unit 11 to the +Y side. The transport unit 12 is configured to include a transport roller 121, a driven roller (not illustrated), which is disposed with the transport roller 121 and the medium A interposed therebetween and is driven by the transport roller 121, and a platen 122. When a driving force from a transport motor (not illustrated) is transmitted and the transport motor is driven by a control of the control unit 15, the transport roller 121 is rotationally driven by the rotational force of the transport roller 121 and transports the medium A along the Y direction in a state where the medium A is interposed between the driven roller and the transport roller 121. The Y direction corresponds to a third direction according to the present disclosure. Further, a platen 122 facing the carriage 13 is provided on the +Y side of the transport roller 121.

The carriage 13 corresponds to a spectroscopic measurement portion according to the present disclosure, and includes a printing portion 16 for printing an image on the medium A and a spectroscope 17 for performing a spectroscopic measurement of a predetermined measurement region R (see FIG. 2) on the medium A. The measurement region R corresponds to a measurement position according to the present disclosure. In the present embodiment, an example is illustrated in which the carriage 13, which is a spectroscopic measurement portion, includes one spectroscope. The carriage 13 is provided so as to be movable by a carriage moving unit 14 along an X direction that intersects the Y direction. Within a movable range of the carriage 13, an end portion on the −X side is a standby position of the carriage 13, and a direction from the standby position toward the +X side is a first direction according to the present disclosure. A direction in which the carriage 13 returns from the predetermined position to the standby position, that is, a direction from the predetermined position toward the −X side is a second direction according to the present disclosure. Furthermore, the carriage 13 being movable along the X direction means that the carriage 13 is movable in the +X side by the carriage moving unit 14 and the carriage 13 is movable in the −X side. The carriage 13 is coupled to the control unit 15 by a flexible circuit 131. Based on an instruction from the control unit 15, the carriage 13 executes printing processing by the printing portion 16 (image forming processing for the medium A) and spectroscopic measurement processing by the spectroscope 17. The detailed configurations of the printing portion 16 and the spectroscope 17 mounted on the carriage 13 will be described later.

The carriage moving unit 14 constitutes a movement mechanism according to the present disclosure, and causes the carriage 13 to reciprocate along the X direction based on an instruction from the control unit 15. The carriage moving unit 14 is configured to include, for example, a carriage guide shaft 141, a carriage motor 142, and a timing belt 143. The carriage guide shaft 141 is disposed along the X direction, and both end portions thereof are fixed to a housing of the printer 10. The carriage motor 142 drives the timing belt 143. The timing belt 143 is supported substantially parallel to the carriage guide shaft 141, and a part of the carriage 13 is fixed. When the carriage motor 142 is driven based on the instruction from the control unit 15, the timing belt 143 runs forward and backward, and the carriage 13 fixed to the timing belt 143 is guided by the carriage guide shaft 141 to reciprocate.

Next, the configurations of the printing portion 16 and the spectroscope 17 mounted on the carriage 13 will be described.

Configuration of Printing Portion 16

The printing portion 16 is disposed so as to face the medium A, discharges ink individually onto the medium A, and forms an image on the medium A. An ink cartridge 161 that supports a plurality of colors of ink is attached to the printing portion 16 in an attachable and detachable manner, and ink is supplied from each ink cartridge 161 to an ink tank (not illustrated) via a tube (not illustrated). Further, nozzles (not illustrated) that discharge ink droplets are provided on a lower surface of the printing portion 16 (a position facing the medium A) in correspondence with each color. For example, piezoelectric elements are disposed in these nozzles and by driving the piezoelectric elements, the ink droplets supplied from the ink tank are discharged and land on the medium A to form dots.

Configuration of Spectroscope 17

Figure 3:
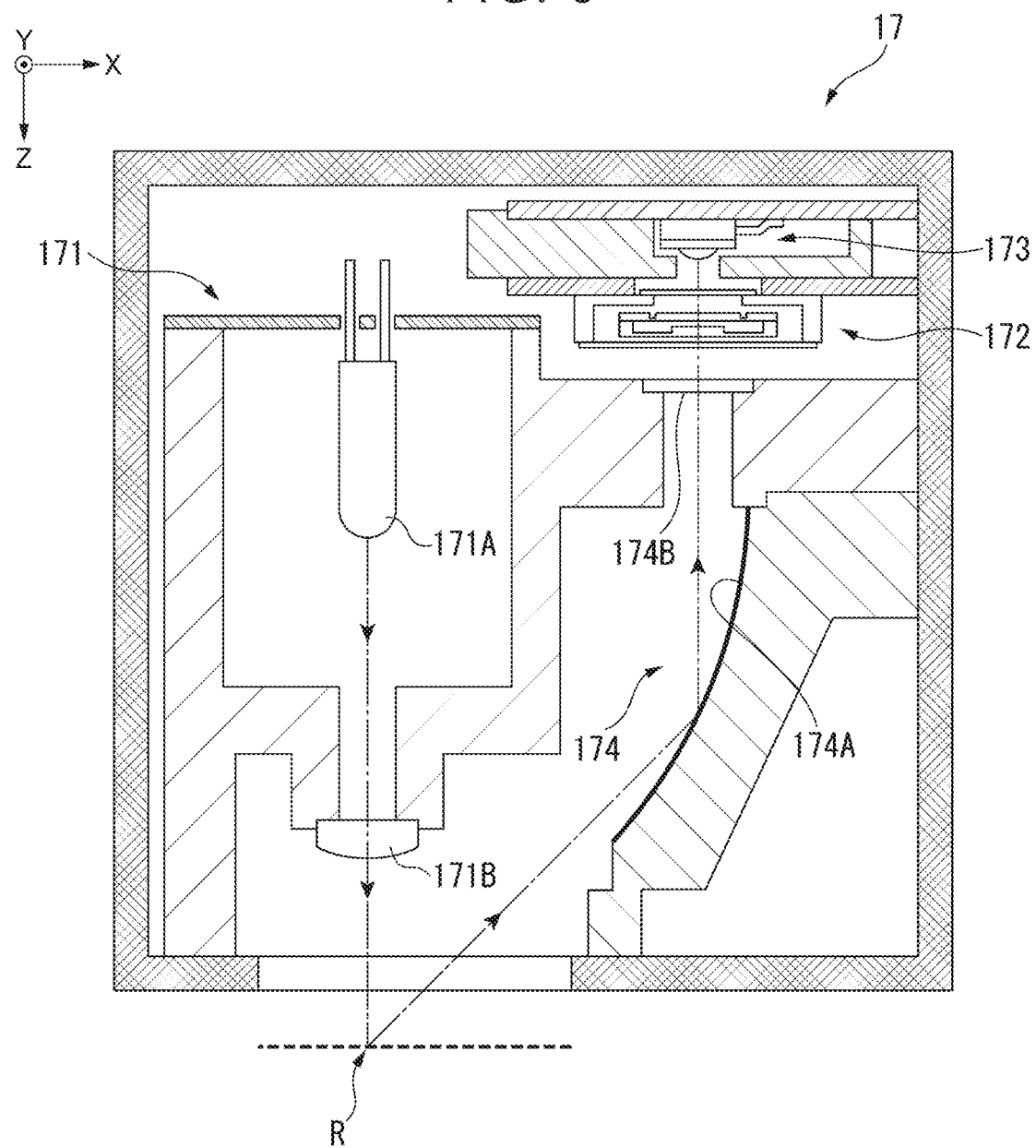
FIG. 3 is a cross-sectional view illustrating a schematic configuration of a spectroscope of the first embodiment.

FIG. 3 is a cross-sectional view illustrating a schematic configuration of the spectroscope 17. As illustrated in FIG. 3, the spectroscope 17 includes a light source portion 171, an optical filter device 172, a light receiving portion 173, and a light guiding portion 174. The spectroscope 17 irradiates the medium A with an illumination light from the light source portion 171 and causes a light component reflected by the medium A to enter the optical filter device 172 by the light guiding portion 174. The optical filter device 172 emits (transmits) light with a predetermined wavelength from the reflected light and causes the light receiving portion 173 to receive the light. Further, the optical filter device 172 can select a transmission wavelength based on the control of the control unit 15 and enables the spectroscopic measurement of the measurement region R on the medium A by measuring the amount of light with each wavelength in visible light.

Configuration of Light Source Portion 171

The light source portion 171 includes a light source 171A and a condensing portion 171B. The light source portion 171 irradiates the measurement region R on the medium A with the light emitted from the light source 171A in a normal direction with respect to a surface of the medium A. As a light source 171A, a light source in which a light emitting spectrum in a visible light range has a plurality of peak wavelengths is desirable, and more desirably it is a light source in which each of a plurality of peak wavelengths appears to be separated by 80 nm or more. As such a light source, for example, a white LED in which an ultraviolet LED and an RGB phosphor are combined can be exemplified, and in addition, a light source such as a fluorescent lamp may be used. The condensing portion 171B is constituted by, for example, a condensing lens or the like, and the light from the light source 171A is condensed on the measurement region R. Although only one lens (condensing lens) is displayed in the condensing portion 171B in FIG. 3, it may be configured by combining a plurality of lenses. In the present embodiment, an example in which the light source portion 171 is included in the spectroscope 17 is illustrated, but the present disclosure is not limited to this. For example, the light source portion 171 may be mounted on the carriage 13 separately from the spectroscope 17.

Configuration of Optical Filter Device 172

Figure 4:
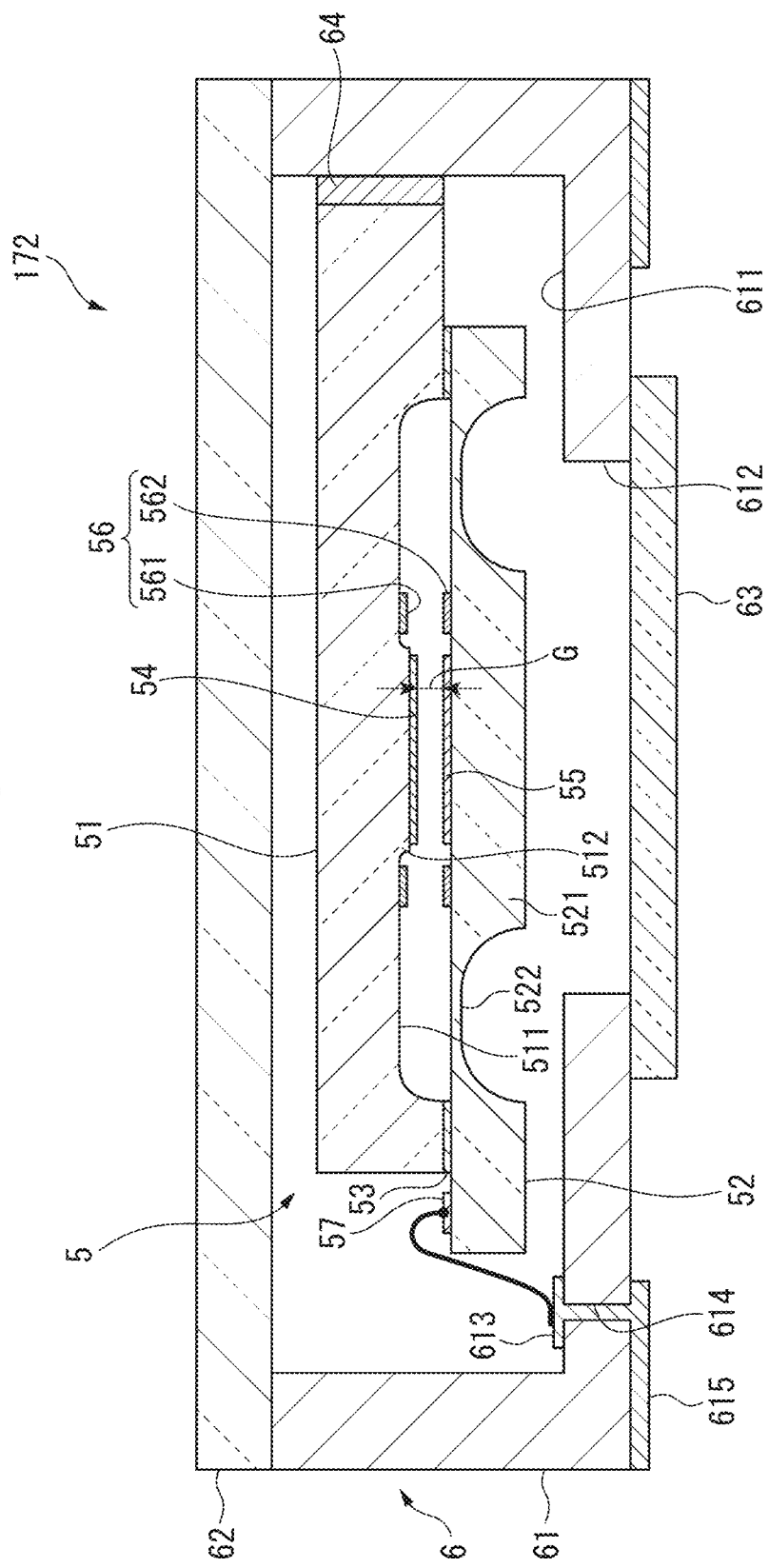
FIG. 4 is a cross-sectional view illustrating a schematic configuration of an optical filter device of the first embodiment.

FIG. 4 is a cross-sectional view illustrating a schematic configuration of the optical filter device 172. The optical filter device 172 includes a housing 6 and a variable wavelength interference filter 5 accommodated inside the housing 6.

The variable wavelength interference filter 5 is a variable wavelength type Fabry-Perot etalon element and includes a first substrate 51 and a second substrate 52 which have transmittance as illustrated in FIG. 4. The first substrate 51 and the second substrate 52 are integrally configured by being bonded to each other with the bonding film 53. The first substrate 51 includes a first groove portion 511 formed by etching and a second groove portion 512 having a shallower groove depth than the first groove portion 511. The first groove portion 511 is provided with a first electrode 561, and the second groove portion 512 is provided with a first reflective film 54. The first electrode 561 is formed, for example, in a ring shape surrounding the second groove portion 512, and faces a second electrode 562 provided on the second substrate 52. The first reflective film 54 is constituted by, for example, a metal film such as Ag, an alloy film such as Ag alloy, a dielectric multilayer film in which a high refractive layer and a low refractive layer are laminated, or a laminated body in which a metal film (alloy film) and a dielectric multilayer film are laminated.

The second substrate 52 includes a movable portion 521 and a diaphragm portion 522 which is provided outside the movable portion 521 and holds the movable portion 521. The movable portion 521 is formed to have a thickness dimension larger than that of the diaphragm portion 522. The movable portion 521 is formed to have a diameter dimension larger than a diameter dimension of the outer peripheral of the first electrode 561, and the second electrode 562 and a second reflective film 55 are provided on a surface of the movable portion 521 facing the first substrate 51. The second electrode 562 is provided at a position facing the first electrode 561. The second reflective film 55 is disposed at a position facing the first reflective film 54 with a gap G interposed therebetween. As the second reflective film 55, a reflective film having the same configuration as the first reflective film 54 described above can be used. Further, when a metal film is used as the first reflective film 54 and the second reflective film 55, or when a transparent electrode is provided on a surface of the dielectric multilayer film, the first reflective film 54 and the second reflective film 55 may function as electrodes for an electrostatic capacitance detection.

The diaphragm portion 522 is a diaphragm that surrounds the periphery of the movable portion 521 and is formed to have a smaller thickness dimension than that of the movable portion 521. Such a diaphragm portion 522 is more flexible than the movable portion 521, and it is possible to displace the movable portion 521 to the first substrate 51 side by a slight electrostatic attractive force. This makes it possible to change a gap dimension of the gap G in a state where the parallelism of the first reflective film 54 and the second reflective film 55 is maintained. In the present embodiment, the diaphragm portion 522 having a diaphragm shape is exemplified, but the present disclosure is not limited to this, and for example, a configuration may be adopted in which holding portions having a beam shape arranged at equal angular intervals around the plane center point are provided. Further, a plurality of electrode pads 57 that are individually coupled to the first electrode 561 and the second electrode 562 are provided on an outer peripheral portion of the second substrate 52 (a region that does not face the first substrate 51).

As illustrated in FIG. 4, the housing 6 includes a base 61 and a glass substrate 62. For the base 61 and the glass substrate 62, for example, a low melting point glass bonding using a glass frit (low melting point glass), an adhesion with an epoxy resin, or the like can be used, whereby an accommodation space is formed inside, and the variable wavelength interference filter 5 is accommodated in the accommodation space.

The base 61 is formed by laminating ceramics on a thin plate, for example, and has a recess portion 611 in which the variable wavelength interference filter 5 can be accommodated. The variable wavelength interference filter 5 is fixed by a fixing member 64 to, for example, a side surface of the recess portion 611 of the base 61. A light passage hole 612 is provided on a bottom surface of the recess portion 611 of the base 61. The light passage hole 612 is provided so as to include a region overlapping the reflective films 54 and 55 of the variable wavelength interference filter 5. Further, a cover glass 63 that covers the light passage hole 612 is bonded to a surface of the base 61 opposite to the glass substrate 62.

Further, the base 61 is provided with an inner side terminal portion 613 coupled to an electrode pad 57 of the variable wavelength interference filter 5, and an inner side terminal portion 613 is coupled to an outer side terminal portion 615 provided on an outer side of the base 61 via a conduction hole 614. The outer side terminal portion 615 is electrically coupled to the control unit 15.

Configuration of Light Receiving Portion 173 and Light Guiding Portion 174

Returning to FIG. 3, the light receiving portion 173 is disposed on an optical axis of the variable wavelength interference filter 5 and receives the light transmitted through the variable wavelength interference filter 5. The light receiving portion 173 outputs a detection signal according to the amount of received light based on the control of the control unit 15. After signal processing is performed by an IV converter, an amplifier, and an AD converter, the detection signal output from the light receiving portion 173 is sampled at a predetermined sampling frequency with a sample and hold circuit (not illustrated). A signal value of the sampled detection signal is output to the control unit 15. The light guiding portion 174 includes a reflecting mirror 174A and a bandpass filter 174B. In the measurement region R, the light guiding portion 174 reflects the light which is reflected at 45° with respect to the surface of the medium A onto the optical axis of the variable wavelength interference filter 5 by the reflecting mirror 174A. The bandpass filter 174B transmits, for example, the light in the visible light range (for example, 380 nm to 720 nm) and cuts the ultraviolet light and infrared light. Thereby, the light in the visible light range is incident on the variable wavelength interference filter 5, and the light receiving portion 173 receives the light with the wavelength selected by the variable wavelength interference filter 5 in the visible light range.

Configuration of Control Unit

The control unit 15 is a control portion according to the present disclosure, and configured to include an I/F 151, a unit control circuit 152, a storage section 153, and a processor 154, as illustrated in FIG. 2. The I/F 151 inputs print data input from an external apparatus 20 to the processor 154. The unit control circuit 152 includes a control circuit that controls each of the supply unit 11, the transport unit 12, the printing portion 16, the light source 171A, the variable wavelength interference filter 5, the light receiving portion 173, and the carriage moving unit 14, and controls an operation of each unit based on an instruction signal from the processor 154. The control circuit of each unit may be provided separately from the control unit 15 and coupled to the control unit 15.

A storage section 153 is, for example, an information storage device such as a semiconductor memory or a hard disk, and stores various programs or various data for controlling the operation of the printer 10. Examples of various data include, for example, V–λ data indicating a wavelength of the light transmitted through the variable wavelength interference filter 5 with respect to a voltage applied to an electrostatic actuator 56 when controlling the variable wavelength interference filter 5, print profile data that stores the discharge amount of each ink with respect to the color data included as print data, or the like. Further, the light emission characteristic (light emitting spectrum) of the light source 171A for each wavelength, the light reception characteristic (light reception sensitivity characteristic) of the light receiving portion 173 for each wavelength, and the like may be stored.

Figure 5:
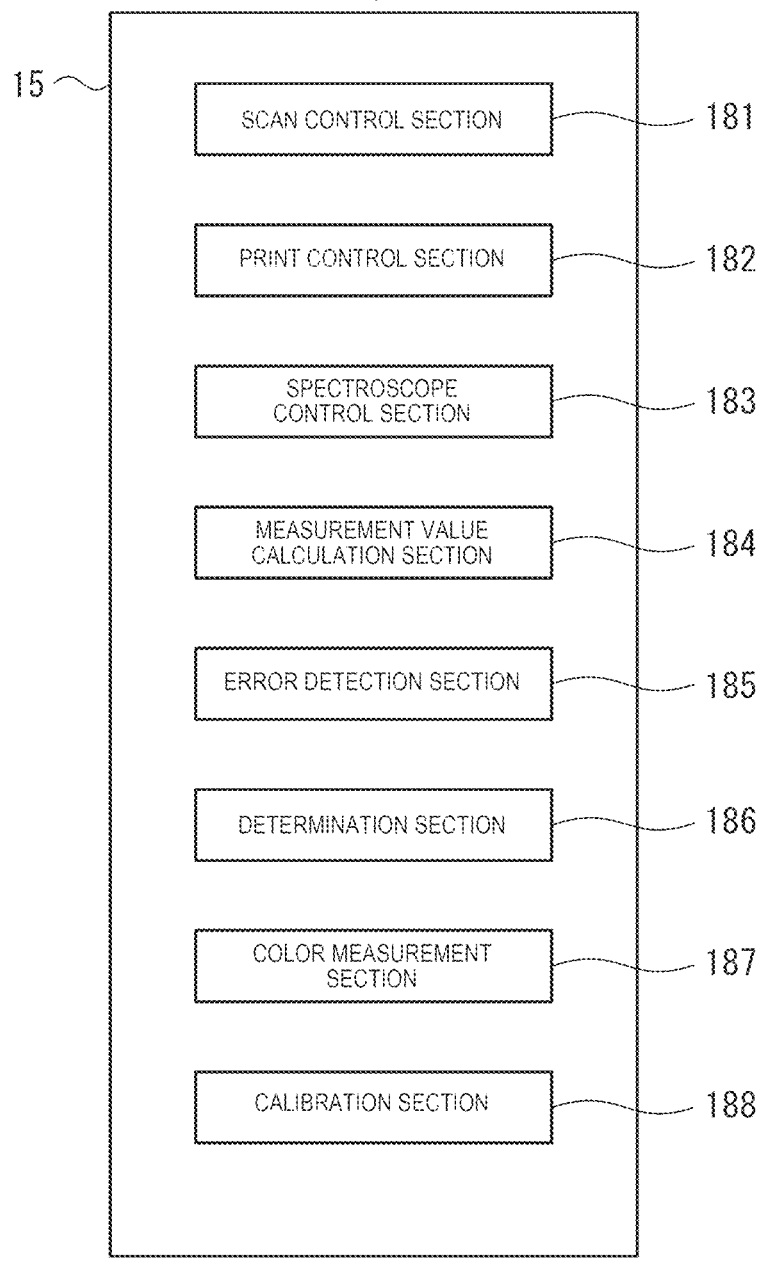
FIG. 5 is a block diagram illustrating a functional configuration of a control unit in the first embodiment.

FIG. 5 is a block diagram illustrating a functional configuration of the control unit 15 of the printer 10. The processor 154 reads out and executes the various programs stored in the storage section 153, thereby as illustrated in FIG. 5, causes the control unit 15 to function as a scan control section 181, a print control section 182, a spectroscope control section 183, a measurement value calculation section 184, an error detection section 185, a determination section 186, a color measurement section 187, and a calibration section 188, or the like.

The scan control section 181 outputs an instruction signal for driving the supply unit 11, the transport unit 12, and the carriage moving unit 14 to the unit control circuit 152. Thereby, the unit control circuit 152 drives the roll drive motor of the supply unit 11 to supply the medium A to the transport unit 12. Further, the unit control circuit 152 drives the transport motor of the transport unit 12 to transport the predetermined region in the medium A to a position facing the carriage 13 of the platen 122 along the Y direction. The unit control circuit 152 drives the carriage motor 142 of the carriage moving unit 14 to move the carriage 13 along the X direction. The scan control section 181 moves the carriage 13 so that a movement speed of the carriage 13, during the printing processing by the printing portion 16 and during the spectroscopic measurement by the spectroscope 17, becomes a constant speed. That is, the scan control section 181 outputs the instruction signal including a speed instruction value to the carriage moving unit 14. Thereby, the carriage moving unit 14 accelerates the carriage 13 for a predetermined time and moves the carriage 13 at a constant speed when the movement speed reaches a speed corresponding to the speed instruction value. The acceleration period is a predetermined time and an amount of movement of the carriage 13 which is moved during the acceleration period is a known distance (hereinafter referred to as an acceleration distance).

The print control section 182 outputs the instruction signal for controlling the printing portion 16 to the unit control circuit 152 based on the print data input from the external apparatus 20, for example. Further, in the present embodiment, the print control section 182 forms the color patch 31 on the medium A based on the data for calibration indicating that the color patch 31 of a predetermined color, which is set in advance, is formed at a predetermined position. The data for calibration may be stored in the storage section 153 or may be input from the external apparatus 20. A detailed description of the color patch 31 will be described later. When the instruction signal is output from the print control section 182 to the unit control circuit 152, the unit control circuit 152 outputs a print control signal to the printing portion 16 and drives the Piezoelectric elements which are provided in the nozzles to discharge the ink onto the medium A. When printing is performed, the carriage 13 is moved along the X direction, a dot forming operation for forming dots by discharging the ink from the printing portion 16 and a transport operation for transporting the medium A in the Y direction are repeated alternately during the movement, and an image composed of a plurality of dots is printed on the medium A.

The spectroscope control section 183 reads out the drive voltage to the electrostatic actuator 56 with respect to the wavelength of the light which is transmitted through the variable wavelength interference filter 5, from the V–λ data in the storage section 153, and outputs the instruction signal to the unit control circuit 152. Thereby, in the unit control circuit 152, a drive voltage in which the variable wavelength interference filter 5 is instructed is applied, and the light with the desired transmission wavelength is transmitted from the variable wavelength interference filter 5. Specifically, when the determination section 186 determines that the entire measurement region R is moved into the color patch 31, the spectroscope control section 183 executes the spectroscopic measurement processing (the main measurement processing) for the color patch 31. The main measurement processing is measurement processing for measuring the color of the color patch 31 corresponding to a second measurement processing according to the present disclosure and is measurement processing for measuring the amount of light for each wavelength at 20 nm intervals in the visible light range of 380 nm to 680 nm, for example. Further, the spectroscope control section 183 switches a spectral wavelength of the spectroscope 17 to a specific wavelength set in advance in order to determine a position of the measurement region R while the main measurement processing is not executed for the color patch 31, and executes the spectroscopic measurement processing (sub measurement processing). The sub measurement processing corresponds to first measurement processing according to the present disclosure.

The measurement value calculation section 184 stores a measured value obtained by spectroscopic processing of the spectroscope 17 and the spectral wavelength of the spectroscope 17 in the storage section 153 in association with each other. The spectral wavelength of the spectroscope 17 is a wavelength of the light that is transmitted through the variable wavelength interference filter 5 and is set by the spectroscope control section 183. In the present embodiment, the measured value obtained by the spectroscopic processing of the spectroscope 17 is calculated based on a signal value of the detection signal output from the spectroscope 17. Specifically, the measurement value calculation section 184 adopts a representative value of a predetermined number of detection signals which are sampled during a predetermined sampling time as a measured value of the spectral wavelength. The representative value may be an average value of the signal values or a mode of the signal values. For example, in the present embodiment, 10 detection signals are sampled during the sampling time and the average value of the signal values of these detection signals is adopted as a measured value.

The error detection section 185 detects a measurement error output when the main measurement processing by the spectroscope 17 is not properly performed. The measurement error can be exemplified by a measurement error output from the spectroscope 17 when the spectroscope 17 cannot perform the appropriate spectroscopic measurement processing. That is, when a disturbance such as vibration is applied during the measurement of the spectroscope 17, the gap G of the variable wavelength interference filter 5 fluctuates, so that appropriate spectroscopic measurement processing cannot be performed. Therefore, the spectroscope 17 measures the vibration of the spectroscope 17 during the spectroscopic measurement and outputs a measurement error when a measured vibration amplitude is larger than or equal to a predetermined value and when the vibration continues for a predetermined time or longer.

The measurement of vibration by the spectroscope 17 is not particularly limited. For example, when the first reflective film 54 and the second reflective film 55 are made to function as electrodes for an electrostatic capacitance detection, the vibration may be detected from the fluctuation in an electrostatic capacitance between the first reflective film 54 and the second reflective film 55. Alternatively, the spectroscope 17 or the carriage 13 may be provided with a vibration detection sensor such as a gyro sensor that detects vibration. Further, the error is not limited to the error due to the vibration of the spectroscope 17 but may be an error due to an error included in the measured value due to other causes, accordingly, these errors may be detected as a measurement error. For example, in the present embodiment, since each color patch is printed based on the data for calibration, the color of each color patch is known. Therefore, the error detection section 185 may detect a measurement error when a color difference between a color based on the measured value obtained by the main measurement processing and a color based on the data for calibration exceeds a predetermined value.

The determination section 186 determines whether the measurement region R which is measured by the spectroscope 17 is within a region of the color patch 31, that is, whether the measurement region R is shifted in position from the color patch 31 and partially protrudes. The color measurement section 187 measures a chromaticity of the color patch 31 based on the measured value obtained by the measurement processing for the color patch 31. The calibration section 188 corrects (updates) print profile data based on the colorimetric result of the color measurement section 187 and the data for calibration. The detailed operation of each functional configuration of the control unit 15 will be described later.

Measurement Method

Figure 6:
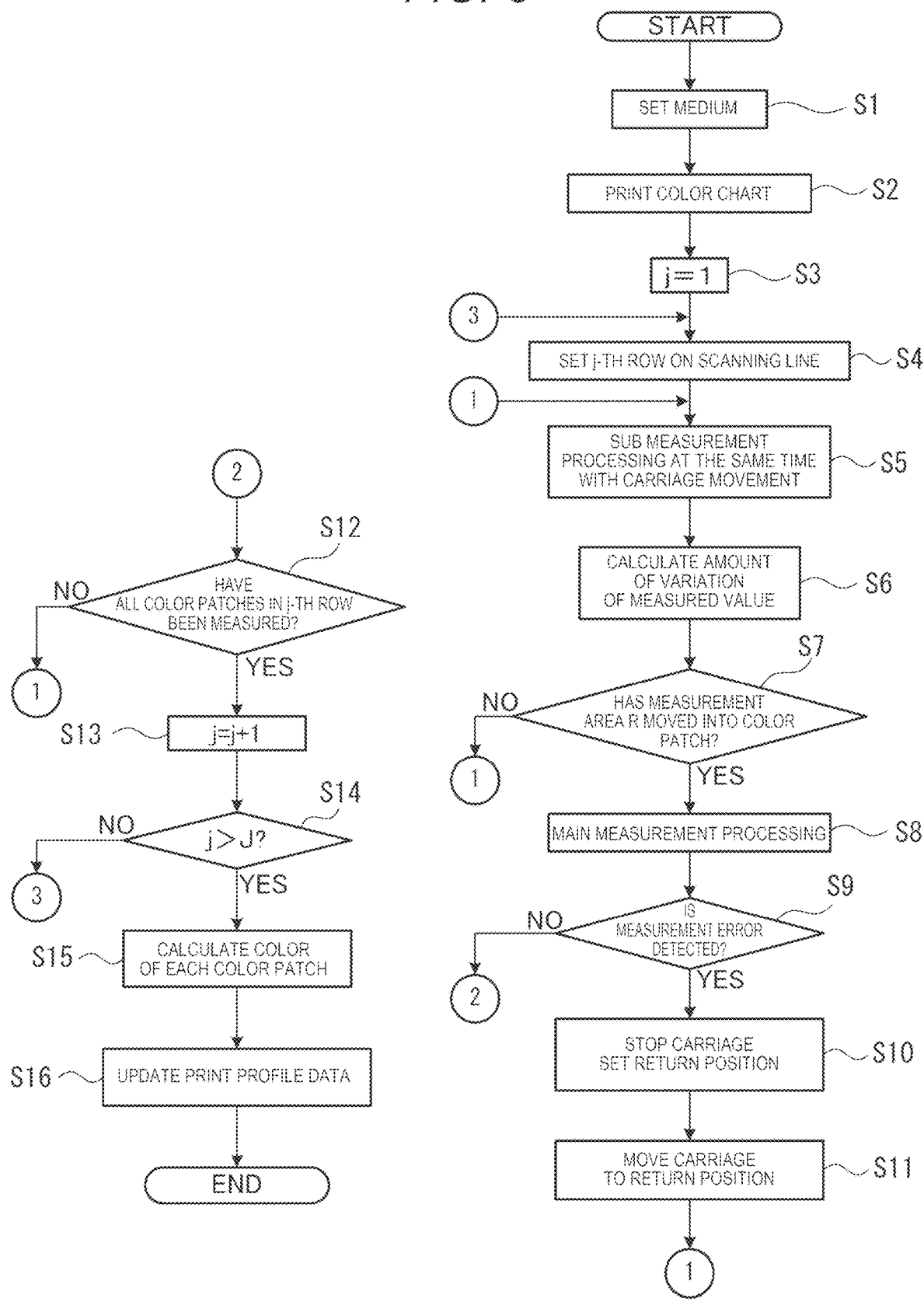
FIG. 6 is a flowchart illustrating a measurement method in the printer of the first embodiment.

Next, a spectroscopic measurement method in the printer 10 of the present embodiment will be described based on the drawings. FIG. 6 is a flowchart illustrating the spectroscopic measurement method in the printer 10. In the present embodiment, a wavelength range, which becomes a measurement target, is a visible light range of 400 nm to 700 nm, and an example is described in which the initial wavelength is defined as 700 nm and the spectroscopic measurement is performed based on the amounts of light of the 16 wavelengths at 20 nm intervals.

In the measurement method of the present embodiment, first, the printer 10 forms a color chart including the color patch 31 on the medium A. The scan control section 181 sets the medium A at a predetermined position (step S1). That is, the scan control section 181 controls the supply unit 11 and the transport unit 12 to transport the medium A to the +Y side, and sets a predetermined print start position of the medium A on the platen 122. Further, the scan control section 181 moves the carriage 13 to an initial position which is positioned at an end portion in the −X side, for example.

Thereafter, the print control section 182 reads out the data for calibration from the storage section 153 and prints the color chart on the medium A in synchronization with the control by the scan control section 181 (step S2). That is, the scan control section 181 causes the carriage 13 to scan in the +X side at a predetermined speed. The print control section 182 specifies a position of the printing portion 16 according to the time from the start of scanning or the motor drive amount and forms dots by discharging the color ink, which is based on the data for calibration, to an image forming position, which is based on the data for calibration. Further, when the carriage 13 is moved to the end portion on the +X side, the scan control section 181 controls the supply unit 11 and the transport unit 12 to transport the medium A to the +Y side. The scan control section 181 causes the carriage 13 to scan to the −X side and the print control section 182 forms a dot at a predetermined position based on the data for calibration. A color chart is formed on the medium A by repeating the dot forming operation and the transport operation as described above.

FIG. 7 is a diagram illustrating an example of a color chart formed in the present embodiment. In the present embodiment, as illustrated in FIG. 7, patch groups 30 are formed by arranging a plurality of colors of the color patches 31 without gaps along the X direction. Further, a plurality of patch groups 30 are formed along the Y direction. The color patches 31 arranged in the patch group 30 include a measurement patch 31A and a return detection patch 31B. The measurement patches 31A are color patches 31 that perform the color measurement for the print correction of the printing portion 16 and are formed in different colors from each other. The return detection patches 31B are white or black color patches 31 and are arranged in the plural in one patch group 30A. For example, the plurality of return detection patches 31B are arranged at constant intervals with a predetermined number of measurement patches 31A interposed therebetween. Further, the color chart 3 is provided with a linear start bar 32 parallel to the Y direction on the −X side of the patch group 30 and a linear goal bar 33 parallel to the Y direction on the +X side of the patch group 30. The start bar 32 and the goal bar 33 are formed in a color different from that of the medium A in reflectance with respect to a specific wavelength, for example, a start bar 32 and a goal bar 33 having black color are formed on the medium A with a white sheet. In the following description, the patch group 30 is arranged in J rows in the Y direction, and the number of rows of the patch group 30, which becomes a measurement target, is indicated by a variable j (j is an integer from 1 to J).

Returning to FIG. 6, after step S2, the scan control section 181 initializes the variable j and sets j=1 (step S3). The scan control section 181 controls the transport unit 12 to transport the medium A along the Y direction, move the j-th row of the color patch 31 to the scanning line of the platen 122, and further, moves the carriage 13 to a predetermined initial position (for example, the end portion on the −X side) (step S4). The scanning line is an imaginary line in which the measurement region R which is measured by the spectroscope 17 moves when the carriage 13 is moved in the X direction.

After step S4, the control unit 15 moves the carriage 13 along the X direction, and at the same time, executes the sub measurement processing by using the spectral wavelength of the spectroscope 17 as a specific wavelength for a position determination (step S5). That is, the scan control section 181 moves the carriage 13 along the X direction. The spectroscope control section 183 applies a drive voltage corresponding to a specific wavelength set in advance to the electrostatic actuator 56. The measurement value calculation section 184 samples the detection signal output from the spectroscope 17, and calculates each of the measured values with respect to the specific wavelength based on the signal values of the predetermined number of sampled detection signals. The specific wavelength is a wavelength for a position determination, and for example, it is desirable to use a peak wavelength of the light emitting spectrum of the light source 171A or a wavelength in the vicinity of the peak wavelength.

Further, the measurement value calculation section 184 further calculates an amount of variation of the measured value ΔV every time the measured value with respect to the specific wavelength is calculated (step S6). Specifically, based on a measured value $V_{(n)}$ which is measured at the n-th time and a measured value $V_{(n-1)}$ which is measured at the (n−1)-th time by the measurement value calculation section 184, the measurement value calculation section 184 calculates the amount of variation ΔV using $\Delta V=|V_{(n)}-V_{(n-1)}|$. The calculated amount of variation of the measured value ΔV is stored in the storage section 153 together with a position of the spectroscope 17 in the X direction, that is, a position of the carriage 13 in the X direction.

Next, the determination section 186 determines whether the entire measurement region R which is measured by the spectroscope 17 is positioned within the color patch 31 (step S7). For example, the determination section 186 determines that whether the amount of variation of the measured value ΔV with respect to a specific wavelength calculated by the measurement value calculation section 184, exceeds a predetermined second threshold value during a predetermined time and after that the amount of variation ΔV falls below a third threshold value that is less than or equal to the second threshold value. That is, when the measurement region R crosses a boundary of the color patch 31 and moves from one color patch 31 to a color patch 31 adjacent to the color patch 31 and having a different color, the measured value monotonically increases or monotonically decreases while the boundary between the color patches 31 is included in the measurement region R. On the other hand, when the entire measurement region R moves over the boundary and moves to the next color patch 31, the measured value becomes a constant value or a substantially constant value. Therefore, as described above, by monitoring the variation in the measured value with respect to the specific wavelength the determination section 186 can determine whether the measurement region R is moved into the color patch 31.

The determination method by the determination section 186 is not limited to the above. For example, when the position of each color patch which is formed based on the data for calibration by the printing portion 16 is known, the determination section 186 may calculate a position of the measurement region R based on the elapsed time after detecting the start bar 32 and the movement speed of the carriage 13. In this case, it is determined whether the calculated position of the measurement region R is positioned at a known position within the color patch 31. Further, a scale sensor that detects a position of the carriage 13 may be provided. In this case, the determination section 186 specifies the position of the measurement region R based on the position of the carriage 13 detected by the scale sensor.

When it is determined as NO in step S7, the process returns to step S5. That is, the control unit 15 continues the processing from step S5 to step S7 until the determination section 186 determines that the entire measurement region R has moved into the color patch 31. When it is determined as YES in step S7, it means that the entire measurement region R is positioned within the color patch 31, that is, is positioned at a predetermined measurement target position of the color patch 31. In this case, the spectroscope control section 183 executes the spectroscopic measurement processing (the main measurement processing) for the color patch 31 (step S8). Specifically, the spectroscope control section 183 sequentially changes the voltage applied to the electrostatic actuator 56 based on the V−λ data. Thereby, for example, the detection signal with respect to the 16 band light in the visible light range is output from the spectroscope 17 to the control unit 15. Similar to step S5, the measurement value calculation section 184 averages the signal values of these detection signals to obtain a measured value and stores the measured value in the storage section 153 in association with the spectral wavelength of the spectroscope 17.

Thereafter, the error detection section 185 determines whether a measurement error is detected in the measurement processing in step S8 (step S9). When it is determined as YES in step S9, that is, when a measurement error is detected, the spectroscope control section 183 suspends the measurement by the spectroscope 17, the scan control section 181 stops the movement of the carriage 13, and further, the return position of the carriage 13 is set by the scan control section 181 (step S10).

In step S10, from the combination of the amount of variation of the measured value ΔV and the position of the carriage 13, which are accumulated in the storage section 153, the scan control section 181 extracts a combination in which the amount of variation of the measured value ΔV exceeds a predetermined first threshold value. That is, the scan control section 181 extracts the position of the carriage 13 in which the amount of variation of the measured value ΔV exceeds the first threshold value. The first threshold value is a value larger than the second threshold value for determining whether the measurement region R crosses the boundary of the color patch 31, and corresponds to a threshold value according to the present disclosure for setting the return position. The scan control section 181 sets, as the return position, a position that is apart from the current position of the carriage 13 by the acceleration distance or more and is closest to the current carriage 13 among the extracted positions. In the present embodiment, the patch group 30 has return detection patches 31B that are arranged at constant intervals. Since the return detection patch 31B is white or black color, the reflectance of the return detection patch 31B and the adjacent measurement patch 31A is significantly different, and the amount of variation of the measured value ΔV exceeds the first threshold value. For example, when the carriage 13 is moved to the +X side in step S5, the measurement patch 31A on the +X side of the return detection patch 31B is detected as a color patch 31 in which the amount of variation of the measured value ΔV exceeds the first threshold value, and is set to the return position. Further, by arranging such return detection patches 31B at constant intervals, the inconvenience that the return position is excessively far from the current position of the carriage 13 is suppressed.

Figures 8, 9:
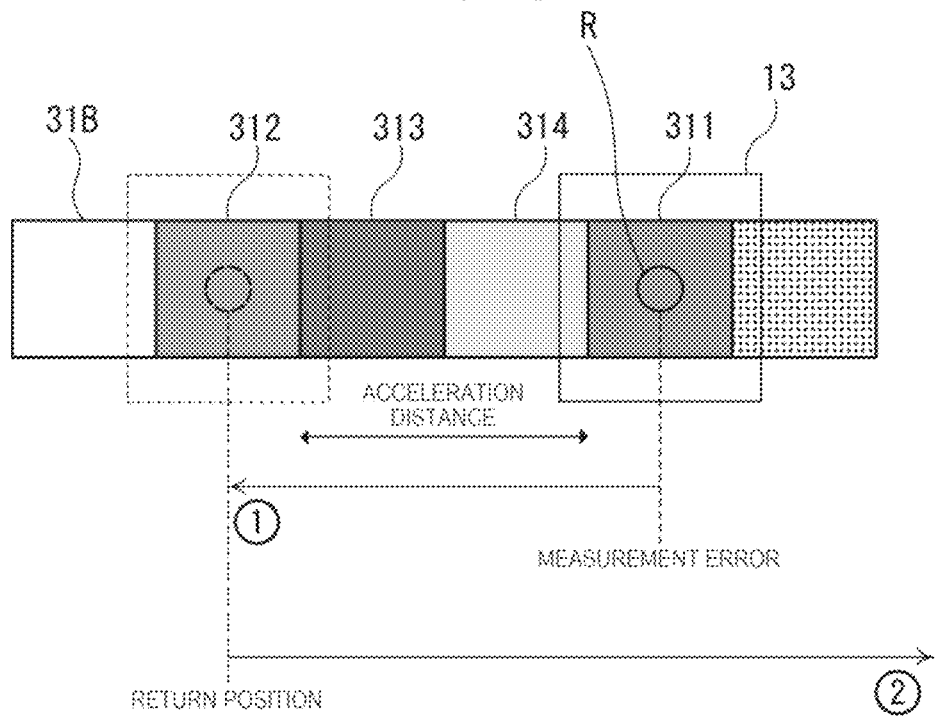
FIG. 8 is a diagram schematically illustrating a movement of a carriage when a measurement error occurs in the first embodiment.
FIG. 9 is a diagram illustrating an example of a measured value with respect to each color patch and an amount of variation of the measured value.

The scan control section 181 moves the carriage 13 to the −X side and returns the carriage 13 to the return position (step S11), and the process returns to step S5. That is, the scan control section 181 moves the carriage 13 to the +X side from the return position again and executes the sub measurement processing and the main measurement processing. FIG. 8 is a diagram schematically illustrating a movement of the carriage when a measurement error occurs. Further, FIG. 9 illustrates the measured value of each color patch and the amount of variation of the measured value. In FIG. 8, when a measurement error is detected in a first color patch 311 in which a patch ID is "9", the scan control section 181 extracts a position where the amount of variation of the measured value ΔV exceeds the first threshold value. In the example illustrated in FIG. 9, the patch IDs "7", "6", and "4" are recorded as positions that exceed the first threshold value. Further, in the present example, the acceleration distance is assumed to be a distance corresponding to the width of the two color patches 31 in the X direction. In this case, the scan control section 181 sets the patch ID "6", which is apart from the current position of the carriage 13, where the measurement error is detected, by two color patches 31 or more, that is, the closest position to the current carriage 13, as a return position. Therefore, as illustrated in FIG. 8, the carriage 13 is moved from the first color patch 311 in which the measurement error is detected to a second color patch 312 corresponding to the patch ID "6" which is the return position to the −X side and is moved to the +X side again. Further, the spectroscope control section 183 does not execute the main measurement processing for a third color patch 313 and a fourth color patch 314 that are within the acceleration distance but executes the main measurement processing for the first color patch 311 exceeding the acceleration distance. Thereby, the re-measurement is performed for the first color patch 311 in which the measurement error is detected. In the present example, the main measurement processing is not executed for the third color patch 313 and the fourth color patch 314 in which the measurement error is detected. However, when the return position is positioned more −X side than the second color patch 312, the main measurement processing may be executed for the third color patch 313 and the fourth color patch 314. In this case, the previously measured values with respect to the third color patch 313 and the fourth color patch 314 stored in the storage section 153 may be updated with the latest measured value or may be updated with an average value of the previously measured value and the latest measured value.

Returning to FIG. 6, when it is determined as NO in step S9, the control unit 15 determines whether the spectroscopic measurement processing is completed for all the color patches 31 in the patch group 30 arranged in the j-th row (step S12). For example, the control unit 15 counts the number of executions of step S8 and determines whether the counted number is the total number I of the color patches 31 arranged in the patch group 30. When it is determined as NO in step S12, the process returns to step S5.

When it is determined as YES in step S12, the scan control section 181 adds "1" to the variable j (step S13) and determines whether the variable j is larger than the maximum value J (step S14). When it is determined as NO in step S14, the process returns to step S4. When it is determined as YES in step S14, the color measurement section 187 calculates the color of each color patch 31 based on the measurement result of the main measurement processing in step S8 executed for each color patch 31 (step S15). For example, the color measurement section 187 calculates the reflectance spectrum of each color patch 31. At this time, the color measurement section 187 may correct the measured value of each measurement patch 31A by using the measured value of the return detection patch 31B as a reference measured value among the color patches 31. Thereafter, the calibration section 188 updates the print profile data stored in the storage section 153 based on the data for calibration and the color calculated from step S12 (step S16).

Operation Effects of Present Embodiment

The printer 10 according to the first aspect of the present disclosure includes the carriage 13 having a spectroscope 17 capable of measuring the light with a predetermined spectral wavelength in the incident light from the medium A and changing the spectral wavelength and the carriage moving unit 14 that moves the carriage 13 relative to the medium A along the X direction. Further, the control unit 15 of the printer 10 functions as an error detection section 185, and the error detection section 185 detects a measurement error indicating that the spectroscopic measurement processing by the spectroscope 17 is not performed normally. Furthermore, the control unit 15 functions as the scan control section 181 and the spectroscope control section 183, executes the sub measurement processing which causes the spectroscope 17 to measure the light with the specific wavelength while moving the carriage 13 to the +X side when measuring the color patch 31 and acquires the measured value for the specific wavelength and the position of the spectroscopic measurement portion obtained by the sub measurement processing. When a measurement error is detected, the scan control section 181 moves the carriage 13 to the −X side to a position where the amount of variation of the measured value is larger than or equal to the first threshold value and then moves the carriage 13 again to +X side to execute the sub measurement processing and the main measurement processing again.

Thereby, in the present embodiment, when a measurement error occurs, the carriage 13 can be returned to the position of the color patch 31 that is close to the position where the measurement error occurred. That is, when the carriage 13 is returned to the position with respect to the measurement error after the measurement for all the color patches 31 is completed, the amount of transport of the medium A or the amount of movement of the carriage 13 becomes large, and the measurement takes time. Further, when a measurement error occurs, it takes a long time to perform the re-measurement from the predetermined initial position. In contrast to this, in the present embodiment, when a measurement error occurs, the carriage 13 can be immediately moved to the vicinity of the color patch 31 in which the measurement error has occurred, and the time required for measurement can be shortened. Further, when the measurement region R is moved to the position of the color patch 31 in which the measurement error has occurred after the measurement of all the color patches 31, although the coordinate position of each color patch 31 is desired to be specified, the general color patch 31 often has no coordinate information. In contrast to this, in the present embodiment, the control unit 15 monitors the amount of variation of the colorimetric value, and when a measurement error occurs, returns the carriage 13 to the position where the amount of variation of the measured value exceeds the first threshold value, thereby the coordinate information of the color patch 31 is unnecessary. That is, even when the color patch 31 having no coordinate information is measured, the carriage 13 in the vicinity of the position of the color patch 31 in which the measurement error has occurred can be returned.

In the present embodiment, the spectroscope 17 mounted on the carriage 13 executes the sub measurement processing of performing a spectroscopic measurement with respect to the specific wavelength while the carriage 13 is moving, and the main measurement processing of switching the spectral wavelength to a plurality of wavelengths and measuring the light with each of the wavelengths. The control unit 15 causes the spectroscope 17 to execute the main measurement processing when the measurement region R which is measured by the spectroscope 17 is positioned at a predetermined measurement target position of the color patch 31 and causes the spectroscope 17 to execute the sub measurement processing while the main measurement processing is not executed. Thereby, the sub measurement processing is continuously executed while the main measurement processing is not executed, and the measurement value calculation section 184 continues to calculate the amount of variation of the measured value with respect to the specific wavelength. That is, the amount of variation of the measured value is constantly monitored while the main measurement processing is not executed. Accordingly, when a measurement error occurs, a return position can be set to the closest position from the current position of the carriage 13.

In the present embodiment, when moving the carriage 13, the carriage moving unit 14 accelerates the carriage 13 from the movement start position to a predetermined acceleration distance and then moves the carriage 13 at a constant movement speed. When a measurement error is detected, the scan control section 181 of the control unit 15 moves the carriage 13 to the −X side to a return position that is apart from the current position of the carriage 13 by at least the acceleration distance or more. Vibration is likely to occur while the carriage 13 is acceleratingly moved. Therefore, it is desirable to avoid the main measurement processing during the acceleration period. In the present embodiment, since the scan control section 181 provides the return position at a position apart from the current position of the carriage 13 by the acceleration distance or more, the movement speed of the carriage 13 when the main measurement processing is executed for the color patch 31 at the position where the measurement error occurs is a constant movement speed, thereby the stable main measurement processing can be executed. Thereby, the inconvenience that the measurement error is detected again can be suppressed.

In the printer 10 of the present embodiment, the printing portion 16 is mounted on the carriage 13. Thereby, the spectroscopic measurement of the color patch which is printed by the printing portion 16 can be performed by the spectroscope 17 that is mounted on the carriage 13.

In the present embodiment, the printing portion 16 includes, as the plurality of color patches 31 arranged along the X direction, a plurality of measurement patches 31A having a predetermined color and a plurality of return detection patches 31B having white or black color, and forms a color chart 3 in which the measurement patches 31A are arranged adjacent to each other on the ±X sides of the return detection patch 31B. In the color chart 3 as described above, the color difference between the measurement patch 31A and the return detection patch 31B is large, and when the sub measurement processing is executed while moving the carriage 13 to the +X side, the amount of variation of the measured value exceeds the first threshold value. Therefore, even when the measurement patches 31A of similar colors are arranged, the return position can be set appropriately.

Second Embodiment

Next, a second embodiment will be described. In the first embodiment, an example in which one spectroscope 17 is mounted on the carriage 13 has been exemplified, but in a second embodiment, a plurality of spectroscopes are mounted on the carriage, which is different from the first embodiment. In the following description, the same components as those in the first embodiment will be designated by the same reference numerals, and the description thereof will be omitted or simplified.

FIG. 10 is a diagram illustrating a schematic configuration of the carriage 13A in the second embodiment. As illustrated in FIG. 10, the carriage 13A of the present embodiment includes a first spectroscope 17A, a second spectroscope 17B, and a third spectroscope 17C. The first spectroscope 17A, the second spectroscope 17B, and the third spectroscope 17C are disposed along the Y direction, that is, a scanning direction of the carriage 13A. Specifically, the second spectroscope 17B is disposed on the −Y side of the first spectroscope 17A, and the third spectroscope 17C is disposed on the +Y side of the first spectroscope 17A. The first spectroscope 17A, the second spectroscope 17B, and the third spectroscope 17C and each of the configurations thereof are the same as those of the spectroscope 17 of the first embodiment.

Figure 11:
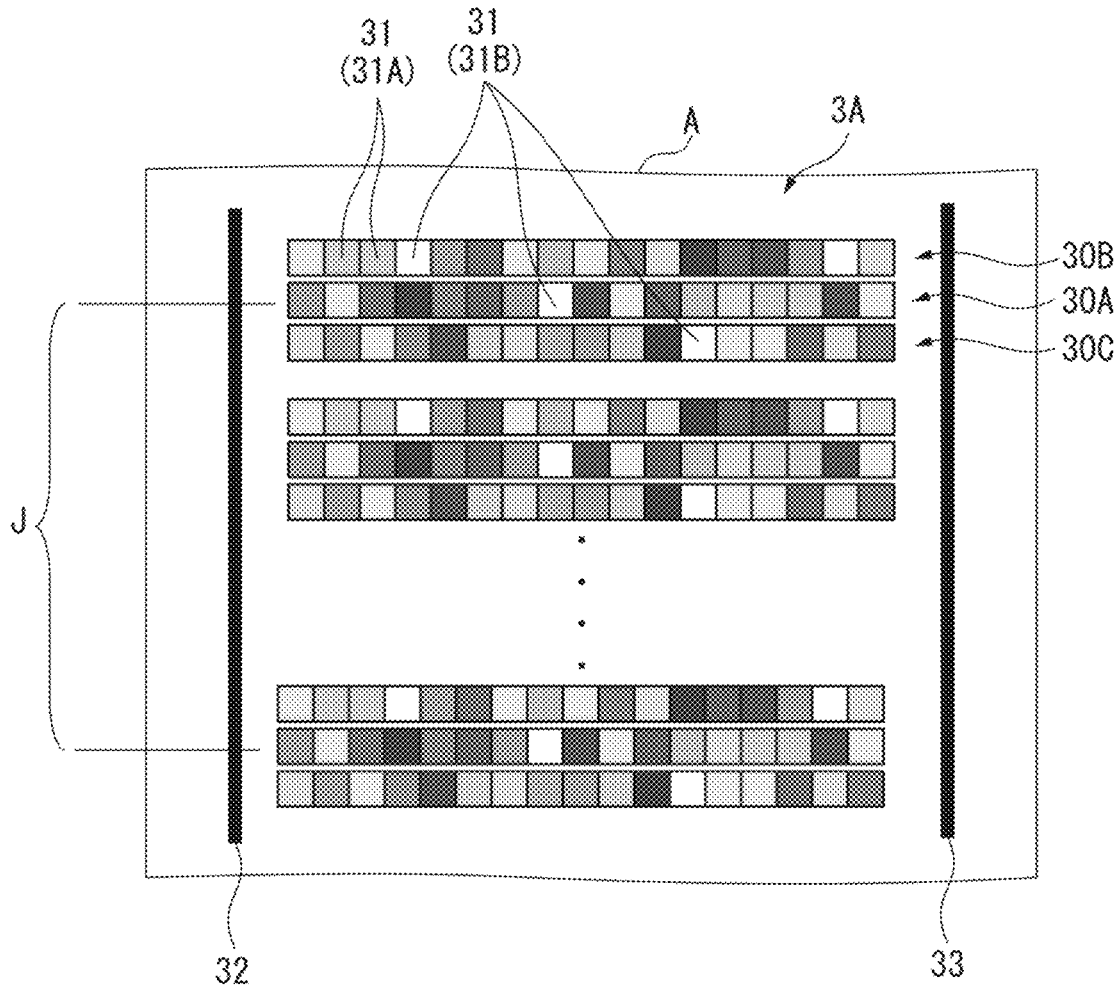
FIG. 11 is a diagram illustrating an example of a color chart of the second embodiment.

In the present embodiment, substantially similar to the first embodiment, the color of the color patch is measured by the measurement method illustrated in FIG. 6, but the processing contents are partially different. Specifically, in the printing of the color chart in step S2, the printing portion 16 and the print control section 182 form a color chart having color patches 31 corresponding to the first spectroscope 17A, the second spectroscope 17B, and the third spectroscope 17C, respectively. FIG. 11 is a diagram illustrating an example of the color chart 3A printed by the printing portion 16 in the present embodiment. In the present embodiment, the color chart 3A is provided with three patch groups, the first patch group 30A facing the measurement region $R_A$ of the first spectroscope 17A, the second patch group 30B facing the measurement region $R_B$ of the second spectroscope 17B, and the third patch group 30C facing the measurement region $R_C$ of the third spectroscope 17C. In the present embodiment, the first patch group 30A, the second patch group 30B, and the third patch group 30C are defined as one group, and J pieces of groups are arranged in the Y direction. Further, in the first patch group 30A, the second patch group 30B, and the third patch group 30C, similar to the first embodiment, white or black return detection patches 31B are arranged. The number of return detection patches 31B included in each one of patch groups 30A, 30B, and 30C is smaller than that in the first embodiment. Further, return detection patches 31B of the second patch group 30B and the third patch group 30C are not disposed in the ±Y sides of a return detection patch 31B arranged in the first patch group 30A. That is, in the projection view seen from the Y direction, the return detection patch 31B of the first patch group 30A, the return detection patch 31B of the second patch group 30B, and the return detection patch 31B of the third patch group 30C have different positions in the X direction from each other and are provided at positions that do not overlap to each other. Further, in the projection view seen along the Y direction, the return detection patches 31B arranged in each of the patch groups 30A, 30B, and 30C are arranged at constant intervals with a predetermined number of color patches 31 interposed along the X direction. For example, in the projection view seen from the Y direction, a predetermined number of color patches 31 may be arranged between the return detection patch 31B of the first patch group 30A and the return detection patch 31B of the second patch group 30B, between the return detection patch 31B of the second patch group 30B and the return detection patch 31B of the third patch group 30C, and between the return detection patch 31B of the third patch group 30C and the return detection patch 31B of the first patch group 30A, respectively.

Further, in step S4, the scan control section 181 transports the medium A and moves the carriage 13A to the initial position in the X direction so that the first spectroscope 17A, the second spectroscope 17B, and the third spectroscope 17C are arranged so as to face the first patch group 30A, the second patch group 30B, and the third patch group 30C, respectively. In step S5, the carriage 13A is moved along the X direction, and at the same time, the first spectroscope 17A, the second spectroscope 17B, and the third spectroscope 17C are each caused to perform the sub measurement processing.

In step S6, the measurement value calculation section 184 calculates the measured value and the amount of variation of the measured value based on the detection signals output from the first spectroscope 17A, the second spectroscope 17B, and the third spectroscope 17C, respectively. That is, the amount of variation of the measured value $\Delta V_1$ which is measured by the first spectroscope 17A, the amount of variation of the measured value $\Delta V_2$ which is measured by the second spectroscope 17B, and the amount of variation of the measured value $\Delta V_3$ which is measured by the third spectroscope 17C are each calculated and stored in the storage section 153 together with the positions of the carriage 13A.

In step S7, the determination section 186 determines whether all the measurement regions R of the first spectroscope 17A, the second spectroscope 17B, and the third spectroscope 17C are positioned within the color patch 31. Since the first spectroscope 17A, the second spectroscope 17B, and the third spectroscope 17C are arranged side by side in the Y direction, it is conceivable that the medium A is inclined with respect to the transport direction or that the medium A has wrinkles when only one of the spectroscopes is shifted from the color patch 31. Therefore, when only one of the spectroscopes is shifted from the color patch 31, a color measurement may be stopped as an unmeasurable error.

When it is determined as YES in step S7, the spectroscope control section 183 executes the main measurement processing for the color patch 31 in step S8. At this time, in the present embodiment, the main measurement processing is executed by each of the first spectroscope 17A, the second spectroscope 17B, and the third spectroscope 17C. In the present embodiment, each color patch 31 of the first patch group 30A is measured by the first spectroscope 17A, each color patch 31 of the second patch group 30B is measured by the second spectroscope 17B, and each color patch 31 of the third patch group 30C is measured by the third spectroscope 17C. Therefore, the time required for measurement can be shortened as compared with the case where the patch group 30 is measured one row at a time with one spectroscope 17 as in the first embodiment.

Furthermore, in step S10, the scan control section 181 extracts the position of the carriage 13A in which any one of the three amounts of variation of the measured values $\Delta V_1$, $\Delta V_2$, and $\Delta V_3$ exceeds the first threshold value. The scan control section 181 sets, as the return position of the carriage 13A, a position that is apart from the current position of the carriage 13A by the acceleration distance or more of the carriage 13A and is closest to the current carriage 13A among the extracted positions. The subsequent processing is the same as in the first embodiment.

Operation Effects of Present Embodiment

In the printer 10 of the present embodiment, as the color chart 3A, the first patch group 30A, the second patch group 30B, and the third patch group 30C are arranged side by side along the Y direction. Further, the carriage 13 includes the first spectroscope 17A, the second spectroscope 17B, and the third spectroscope 17C, which are arranged along the Y direction. The first spectroscope 17A measures the color patch 31 of the first patch group 30A, the second spectroscope 17B measures the color patch 31 of the second patch group 30B, and the third spectroscope 17C measures the color patch 31 of the third patch group 30C. Thereby, the three spectroscopes 17A, 17B, and 17C can execute the main measurement processing for the three color patches 31 at a time, and the main measurement processing for all the color patches 31 can be quickly completed.

In the present embodiment, the scan control section 181 of the control unit 15 causes each of the first spectroscope 17A, the second spectroscope 17B, and the third spectroscope 17C to execute the sub measurement processing, and the measurement value calculation section 184 calculates the amounts of variation of the measured values $\Delta V_1$, $\Delta V_2$, and $\Delta V_3$, respectively, based on the detection signals output from each of the spectroscopes 17A, 17B, and 17C. When a measurement error is detected by the error detection section 185, a return position is set where at least one of the amounts of variation of the measured values $\Delta V_1$, $\Delta V_2$, and $\Delta V_3$ is larger than or equal to the first threshold value, and the carriage 13 is moved to the return position. As described above, by using the three spectroscopes 17A, 17B, and 17C, the return position closest to the carriage 13 can be set more appropriately. For example, even when the adjacent color patches 31 of the first patch group 30A have the same color, there may be cases that the color difference between adjacent color patches 31 in the second patch group 30B is large, and the amount of variation of the measured value in the second spectroscope 17B exceeds the first threshold value. In this case, the return position can be set at a position closer to the current position of the carriage 13, as compared with the case where the return position is set only by the sub measurement processing for the first patch group 30A.

In the present embodiment, the printing portion 16 forms a color chart 3A in which the first patch group 30A, the second patch group 30B, and the third patch group 30C are arranged in the Y direction. In the projection view seen from the Y direction, the return detection patch 31B of the first patch group 30A, the return detection patch 31B of the second patch group 30B, and the return detection patch 31B of the third patch group 30C have different positions in the X direction from each other and are provided at positions that do not overlap to each other. By providing such a return detection patch 31B, similar to the first embodiment, the return position can be appropriately set even when the measurement patches 31A of similar colors are arranged. Further, as compared with the first embodiment, it is possible to reduce the number of return detection patches 31B included in one patch group, and accordingly, it is possible to arrange a large number of measurement patches 31A. Thereby, the measurement time for measuring each color patch 31 in the color chart 3A can be shortened.

MODIFICATION EXAMPLES

The present disclosure is not limited to the above-described embodiments, and the present disclosure includes modifications, improvements, and combinations obtained by appropriately combining the embodiments within a range that can achieve the object of the present disclosure.

Modification Example 1

In the first and second embodiments described above, an example has been described in which the printing portion 16 forms the patch group 30, the first patch group 30A, the second patch group 30B, and the third patch group 30C that include the white or black return detection patch 31B, but the present disclosure is not limited to this. For example, the return detection patch 31B may not be included when color charts 3 and 3A, in which in the adjacent color patches 31 where the sub measurement processing is executed, the difference in reflectance with respect to a specific wavelength is larger than or equal to the first threshold value, are formed.

Further, the color charts 3 and 3A may have a configuration in which white or black frame images are provided between each of the color patches 31. In this case, when the amount of variation of the measured value with respect to the specific wavelength is measured in the sub measurement processing, when the frame image is included in the measurement regions R, $R_A$, $R_B$, and $R_C$, the amount of variation of the measured value becomes a value that exceeds the first threshold value. In this case, each position of each color patch 31 can be specified. That is, it is possible to set the color patch 31 at a position that is apart from the current carriages 13 and 13A by the acceleration distance or more and is closest to the current carriages 13 and 13A as the return position.

Modification Example 2

In the second embodiment, an example has been described in which light with the same specific wavelength is measured by each of the first spectroscope 17A, the second spectroscope 17B, and the third spectroscope 17C in the sub measurement processing. In contrast to this, the specific wavelengths measured by the first spectroscope 17A, the second spectroscope 17B, and the third spectroscope 17C may be different for each spectroscope. For example, the first spectroscope 17A may use a predetermined first specific wavelength in a red wavelength range, the second spectroscope 17B may use a predetermined second specific wavelength in a green wavelength range, and the third spectroscope 17C may use a predetermined third specific wavelength in a blue wavelength range.

Modification Example 3

In the above-described embodiment, the measurement value calculation section 184 samples the detection signals output from the spectroscope 17 to calculate the average value thereof as the measured value, and the difference between the measured value calculated at the n-th time and the measured value calculated at the (n−1)-th time is defined as the amount of variation of the measured value ΔV. In the contrast to this, the spectroscope 17 may include a differentiating circuit that differentiates the detection signals, and the measurement value calculation section 184 may sample the signal values of the differential signals output from the differentiating circuit to acquire as the amount of variation of the measured value. The same applies to the second embodiment, a first differentiating circuit that differentiates the detection signals from the first spectroscope 17A, a second differentiating circuit that differentiates the detection signals from the second spectroscope 17B, and a third differentiating circuit that differentiates the detection signals from the third spectroscope 17C may be included.

Modification Example 4

In the second embodiment, the first spectroscope 17A, the second spectroscope 17B, and the third spectroscope 17C are exemplified as the plurality of spectroscopes, but four or more spectroscopes may be provided on the carriage 13A, or only two spectroscopes may be provided.

Modification Example 5

In the above embodiment, the carriage moving unit 14 that moves the carriages 13 and 13A in the +X direction is exemplified as the movement mechanism according to the present disclosure, but the present disclosure is not limited thereto. For example, the carriages 13 and 13A may be fixed and the medium A may be moved with respect to the carriages 13 and 13A. In this case, it is possible to suppress the vibration of the variable wavelength interference filter 5 which is associated with the movement of the carriages 13 and 13A, and stabilize the transmission wavelength of the variable wavelength interference filter 5. Further, an example has been illustrated in which the carriages 13 and 13A are caused to scan along the X direction with respect to the plurality of color patches 31 that are arranged along the X direction, but the carriages 13 and 13A may be caused to scan along the Y direction with respect to a plurality of color patches 31 that are arranged along the Y direction. In this case, by transporting the medium A by the transport unit 12 in the Y direction, the measurement regions R, $R_A$, $R_B$, and $R_C$ can be relatively moved to the color patch 31.

Modification Example 6

In the above embodiment, the example has been described in which the sub measurement processing and the main measurement processing for each color patch 31 are executed while moving the carriages 13 and 13A to the +X side, but the sub measurement processing and the main measurement processing for each color patch 31 may be executed while moving the carriages 13 and 13A to the −X side.

Modification Example 7

In the above embodiment, the printer 10 is exemplified as an example of the measurement device, but the present disclosure is not limited to this. For example, a measurement device that does not include the printing portion 16 and executes only color measurement processing on the medium A may be used.

Modification Example 8

In the above embodiment, an example has been described in which the carriages 13 and 13A are moved at a constant speed in the X direction, but the present disclosure is not limited to this. For example, the movement speeds of the carriages 13 and 13A may not be constant. In this case, when a measurement error is detected by the error detection section 185, the movement of the carriages 13 and 13A is reversed (moved to the −X side), and the sub measurement processing is executed. In the sub measurement processing, the color patch 31 in which the amount of variation of the measured value is greater than or equal to the first threshold value is set as a return position, the carriages 13 and 13A are stopped, and the carriages 13 and 13A are moved to the +X side again.

Modification Example 9

In each of the above-described embodiments, an example has been described in which the spectroscope 17 includes the variable wavelength interference filter 5 as a spectroscopic element capable of changing the spectral wavelength when the light from the measurement target is dispersed, but the present disclosure is not limited to this. For example, the spectroscopes 17, 17A, 17B, and 17C may be configured to include various types of spectroscopic elements such as acousto-optic tunable filter (AOTF), liquid crystal tunable filter (LCTF), and grating that can change the spectral wavelength instead of the variable wavelength interference filter 5. Further, in the above embodiment, an example has been described in which the spectroscopes 17, 17A, 17B, and 17C have a so-called post-spectroscopic type configuration where the incident light from the medium A is dispersed, but a so-called pre-spectroscopic type configuration may be adopted in which illumination light from the light source portion 171 is dispersed into a predetermined spectral wavelength and is applied to the medium A.

ROUNDUP OF PRESENT DISCLOSURE

According to a first aspect of the present disclosure, there is provided a measurement device including: a spectroscope configured to measure light with a predetermined spectral wavelength of incident light from a measurement target and change the spectral wavelength; a movement mechanism configured to relatively move the spectroscope along a first direction with respect to the measurement target; and one or more processors configured to execute detecting a measurement error indicating that spectroscopic measurement processing by the spectroscope is not executed normally, and controlling the spectroscope and the movement mechanism, in which the one or more processors, when the measurement target is a plurality of color patches arranged along the first direction, cause the spectroscope to execute first measurement processing of measuring light with a specific wavelength set in advance while relatively moving the spectroscope in the first direction to acquire a measured value with respect to the specific wavelength obtained by the first measurement processing and a position of the spectroscope, and when the measurement error is detected, move the spectroscope to a position where an amount of variation of the measured value is greater than or equal to a threshold value in a second direction opposite to the first direction and then move the spectroscope in the first direction.

As described above, when the measurement error occurs, the spectroscope can be returned to the position of the color patch that is close to the position where the measurement error has occurred. That is, when the spectroscope is returned to the position where the measurement error occurs after the measurement for all the color patches is completed, the amount of the relative movement of the spectroscope increases, and the measurement takes time. In contrast to this, in the present aspect, when the measurement error occurs, the spectroscope can be immediately moved to the vicinity of the color patch in which the measurement error has occurred, and the time required for measurement can be shortened. Further, when the spectroscope is moved to the position of the color patch where the measurement error has occurred after the measurement is completed, the coordinate position of each color patch needs to be specified. In contrast to this, in the present aspect, even when a color patch having no coordinate information is measured, it is possible to re-measure the color patch in which the measurement error has occurred.

In the measurement device of the present aspect, the spectroscope may execute the first measurement processing and second measurement processing of switching the spectral wavelength to a plurality of wavelengths to measure light with the respective wavelengths, and the one or more processors may cause the spectroscope to execute the second measurement processing when a measurement position measured by the spectroscope is positioned at a predetermined measurement target position of the color patch and cause the spectroscope to execute the first measurement processing while the second measurement processing is not being executed. In the present aspect, the first measurement processing is always being executed while the second measurement processing for measuring the color of the color patch is not executed. Accordingly, when the measurement error occurs, a return position can be set to the closest position from the current position of the spectroscope.

In the measurement device of the present aspect, when the spectroscope is moved, the movement mechanism may accelerate the spectroscope from a movement start position to a predetermined acceleration distance and then relatively move the spectroscope at a constant movement speed, and when the measurement error is detected, the one or more processors may move the spectroscope in the second direction by at least the acceleration distance or more. Since vibration is likely to occur while the spectroscope is acceleratingly moved, when the second measurement processing is executed on the color patch during the acceleration period, a measurement error is easily detected. In contrast to this, in the present aspect, the spectroscope is moved in the second direction to a position apart by an acceleration distance or more. Thereby, when the second measurement processing is executed for the color patch in which the measurement error has occurred, the movement speed of the spectroscope is a constant movement speed. Therefore, when the color patch in which the measurement error has occurred is re-measured, the stable second measurement processing can be executed.

In the measurement device of the present aspect, the plurality of color patches arranged in the first direction may be defined as one patch group, a plurality of the patch groups may be provided in a third direction orthogonal to the first direction, the spectroscope may include a plurality of spectroscopes for measuring light with a predetermined spectral wavelength of incident light from a measurement target, and the plurality of spectroscopes may be arranged along the third direction and face patch groups different from each other. Accordingly, the plurality of spectroscopes can execute the second measurement processing for the plurality of color patches 31 at a time, and the measurement processing for all the color patches can be quickly completed.

In the measurement device of the present aspect, the one or more processors may cause each of the plurality of spectroscopes to execute the first measurement processing to acquire the measured value obtained by each of the plurality of spectroscopes and a position of the spectroscope, and when the measurement error is detected, cause the spectroscope to move to a position where an amount of variation of the measured value acquired in the first measurement processing of at least one of the spectroscopes is greater than or equal to a threshold value in the second direction. In this way, by using a plurality of spectroscopes, the amount of movement of the spectroscope in the second direction when a measurement error occurs can be minimized. For example, even when the color patches adjacent to each other in one patch group have similar colors when the color difference between adjacent color patches in the other patch group is large, the spectroscope may be moved to the position of the adjacent color patch in the other patch group in the second direction. When the spectroscope is excessively moved in the second direction when a measurement error occurs, the time required for the re-measurement of the color patch becomes long. In contrast to this, in the present aspect, as described above, the amount of movement of the spectroscope in the second direction can be reduced, and therefore the time required for the re-measurement of the color patch can be shortened.

According to a second aspect of the present disclosure, there is provided a printer including: the measurement device according to the first aspect; and a printing portion forming a color chart that includes a plurality of color patches along the first direction on the measurement target. In such a printer 10, the spectroscopic measurement can be performed for the color patch which is printed by the printing portion 16 by the spectroscope. Therefore, it is not necessary to transfer the measurement target on which the color patch is printed to a measurement device.

In the printer of the present aspect, the printing portion may include, as the plurality of color patches arranged along the first direction, a plurality of measurement patches having a predetermined color and a plurality of return detection patches having white color or black color, and forms the color chart in which the measurement patches are arranged adjacent to each other in the first direction and the second direction of the return detection patches. In such a color chart, the color difference between the measurement patch and the return detection patch is large, and when the sub measurement processing is executed while moving the spectroscope to the +X side, the amount of variation of the measured value exceeds the threshold value. Therefore, even when the measurement patches of similar colors are arranged, the return position can be set appropriately.

In the printer of the present aspect, the printing portion may form the color chart in which with the plurality of color patches arranged along the first direction as one patch group, a plurality of the patch groups are arranged in a third direction orthogonal to the first direction and the return detection patches of the plurality of patch groups are arranged at positions where the return detection patches do not overlap with each other in a projection view in which the plurality of patch groups are viewed from the third direction. In the present aspect, when the spectroscope includes a plurality of spectroscopes along the second direction, each spectroscope can measure different patch groups. Further, as compared with the case where one patch group is measured by one spectroscope, the return detection patches can be distributed and arranged in a plurality of patch groups. Therefore, it is possible to reduce the number of return detection patches included in one patch group and arrange a large number of measurement patches accordingly. As a result, it is possible to more efficiently execute the measurement processing for a plurality of color patches and reduce the measurement time.

According to a third aspect of the present disclosure, there is provided a measurement method of a measurement device including a spectroscope configured to measure light with a predetermined spectral wavelength of incident light from a measurement target and change the spectral wavelength, a movement mechanism configured to relatively move the spectroscope along a first direction with respect to the measurement target, and one or more processors configured to detect a measurement error indicating that spectroscopic measurement processing by the spectroscope is not executed normally, the method including: when the measurement target is a plurality of color patches arranged along the first direction, causing the spectroscope to execute first measurement processing of measuring light with a specific wavelength set in advance while relatively moving the spectroscope in the first direction to acquire a measured value with respect to the specific wavelength obtained by the first measurement processing and a position of the spectroscope; and when the measurement error is detected, moving the spectroscope to a position where an amount of variation of the measured value is greater than or equal to a threshold value in a second direction opposite to the first direction and then moving the spectroscope in the first direction. In such a measurement method, when a measurement error occurs, the spectroscope can be immediately returned to the position of the color patch close to the position where the measurement error has occurred, and the time required for measurement can be shortened. Further, even when a color patch having no coordinate information is measured, it is possible to re-measure a color patch in which a measurement error has occurred.

What is claimed is:

1. A measurement device comprising:
   a spectroscope configured to measure light with a predetermined spectral wavelength of incident light from a measurement target and change the predetermined spectral wavelength;
   a motor configured to relatively move the spectroscope along a first direction with respect to the measurement target; and
   a processor configured to execute
      detecting a measurement error indicating that spectroscopic measurement processing by the spectroscope is not executed normally, and
      controlling the spectroscope and the motor, wherein the processor, when the measurement target is a plurality of color patches arranged along the first direction, causes the spectroscope to execute first measurement processing of measuring light with a specific wavelength set in advance while relatively moving the spectroscope in the first direction to acquire a measured value with respect to the specific wavelength obtained by the first measurement processing and a position of the spectroscope, and when the measurement error is detected, moves the spectroscope to a position where an amount of variation of the measured value is greater than or equal to a threshold value in a second direction opposite to the first direction and then moves the spectroscope in the first direction.

2. The measurement device according to claim 1, wherein the spectroscope further executes the first measurement processing and second measurement processing of switching the predetermined spectral wavelength to a plurality of wavelengths to measure light with respective wavelengths, and the processor further causes the spectroscope to execute the second measurement processing when a measurement position measured by the spectroscope is positioned at a predetermined measurement target position of a color patch of the plurality of color patches and causes the spectroscope to execute the first measurement processing while the second measurement processing is not being executed.

3. The measurement device according to claim 1, wherein when the spectroscope is moved, the motor further accelerates the spectroscope from a movement start position to a predetermined acceleration distance and then relatively moves the spectroscope at a constant movement speed, and when the measurement error is detected, the processor further moves the spectroscope in the second direction by at least the acceleration distance or more.

4. The measurement device according to claim 1, wherein the plurality of color patches arranged in the first direction are defined as one patch group, a plurality of patch groups are provided in a third direction orthogonal to the first direction, the spectroscope includes a plurality of spectroscopes for measuring the light with the predetermined spectral wavelength of the incident light from the measurement target, and the plurality of spectroscopes are arranged along the third direction and face the plurality of patch groups different from each other.

5. The measurement device according to claim 4, wherein the processor further:

causes each of the plurality of spectroscopes to execute the first measurement processing to acquire the measured value obtained by each of the plurality of spectroscopes and a position of the spectroscope, and when the measurement error is detected, causes the spectroscope to move to the position where the amount of the variation of the measured value acquired in the first measurement processing of at least one of the plurality of spectroscopes is greater than or equal to the threshold value in the second direction.

6. A printer comprising:

the measurement device according to claim 1; and a printing portion forming a color chart that includes the plurality of color patches along the first direction on the measurement target.

7. The printer according to claim 6, wherein the printing portion includes, as the plurality of color patches arranged along the first direction, a plurality of measurement patches having a predetermined color and a plurality of return detection patches having a white color or a black color, and forms the color chart in which the plurality of measurement patches are arranged adjacent to each other in the first direction and the second direction of the plurality of return detection patches.

8. The printer according to claim 7, wherein the printing portion forms the color chart in which with the plurality of color patches arranged along the first direction as one patch group, a plurality of patch groups are arranged in a third direction orthogonal to the first direction and the plurality of return detection patches of the plurality of patch groups are arranged at positions where the plurality of return detection patches do not overlap with each other in a projection view in which the plurality of patch groups are viewed from the third direction.

9. A measurement method of a measurement device including a spectroscope configured to measure light with a predetermined spectral wavelength of incident light from a measurement target and change the predetermined spectral wavelength, a motor configured to relatively move the spectroscope along a first direction with respect to the measurement target, and a processor configured to detect a measurement error indicating that spectroscopic measurement processing by the spectroscope is not executed normally, the method comprising:

causing the spectroscope to execute first measurement processing of measuring light with a specific wavelength set in advance while relatively moving the spectroscope in the first direction to acquire a measured value with respect to the specific wavelength obtained by the first measurement processing and a position of the spectroscope, wherein the measurement target is a plurality of color patches arranged along the first direction; and moving, based on the detection of the measurement error the spectroscope to a position where an amount of variation of the measured value is greater than or equal to a threshold value in a second direction opposite to the first direction and then moving the spectroscope in the first direction.

* * * * *